United States Patent [19]
Lakin et al.

[11] Patent Number: 6,124,682
[45] Date of Patent: Sep. 26, 2000

[54] LAMP DRIVER CIRCUIT USING RESONANT CIRCUIT FOR STARTING LAMP

[75] Inventors: Richard Anthony Lakin, Bishop Auckland; Isaac David Gurwicz, Gateshead, both of United Kingdom

[73] Assignee: Micro Tech Limited, Gateshead, United Kingdom

[21] Appl. No.: 09/313,193

[22] Filed: May 18, 1999

Related U.S. Application Data

[63] Continuation of application No. PCT/GB97/03172, Nov. 19, 1997.

[30] Foreign Application Priority Data

Nov. 19, 1996 [GB] United Kingdom .................... 9624167

[51] Int. Cl.[7] ..................................... H05B 37/02
[52] U.S. Cl. ..................... 315/291; 315/209 R; 315/308; 315/224
[58] Field of Search ..................................... 315/224, 307, 315/291, 209 R, 247, 308, DIG. 7, 276, 225

[56] References Cited

U.S. PATENT DOCUMENTS

| | | | |
|---|---|---|---|
| 4,170,747 | 10/1979 | Holmes | 315/224 |
| 4,719,390 | 1/1988 | Sairanen | 315/224 |
| 4,725,762 | 2/1988 | Jagschitz | 315/307 |
| 5,087,859 | 2/1992 | Blankers | 315/307 |
| 5,434,479 | 7/1995 | Ohnishi et al. | 315/224 |
| 5,712,533 | 1/1998 | Corti | 315/307 |
| 5,739,644 | 4/1998 | Bernitz et al. | 315/307 |
| 5,742,132 | 4/1998 | Huber et al. | 315/209 R |
| 5,932,976 | 8/1999 | Maheshwari et al. | 315/307 |

*Primary Examiner*—Don Wong
*Assistant Examiner*—Wilson Lee
*Attorney, Agent, or Firm*—Larson & Taylor, PLC

[57] ABSTRACT

A lamp driver circuit for a discharge lamp in which a high frequency is used to initiate a discharge and a lower frequency is used to sustain the discharge. A tuned circuit boosts the voltage at the starting frequency. In addition, a transformer is connected to the tuned circuit to provide a further boost to the starting voltage. The transformer core may be made of a different material from that of the inductor of the tuned circuit, and is preferably selected to saturate during starting, to enhance the voltage spikes available for starting the lamp.

14 Claims, 3 Drawing Sheets

LAMP DRIVER CIRCUIT USING RESONANT CIRCUIT FOR STARTING LAMP

This is a continuation application of PCT/GB97/03172 filed on Nov. 19, 1997, designating the United States of America.

BACKGROUND OF THE INVENTION

The present invention relates to a driver circuit for lamps, particularly but not exclusively arc discharge lamps, which conventionally require a higher voltage to commence operation than is required to sustain a discharge.

Arc discharge lamps require an alternating current source of a relatively low frequency to drive the lamp. In addition, to start the lamp, a very high voltage pulse is usually required. Such lamps are well known, common examples of lamps using metal halide technology; the details of the lamp itself are not critical to the present invention.

A conventional circuit for driving an arc discharge lamp is illustrated schematically in FIG. 1. This circuit uses a high frequency switching transistor Q1 connected to an inductor I1 to produce a controlled current of a suitable value for driving the lamp. The high voltage is then converted to an alternating voltage of relatively low frequency by a switching bridge network comprising transistors Q2–5. The transistors are driven via respective isolators DR1-5 by integrated controller 31. Ignition is provided by a pulse transformer 15 in series with the lamp 13, which, on actuation, generates a very high voltage pulse of the order of 15 KV to 40 KV to start the lamp.

A problem with the conventional circuit is that the use of such a high starting voltage can present problems. In particular, the circuitry needs to be heavily insulated to withstand voltages much higher than those that are present during normal operation of the lamp. This leads to increased cost, and often increased size of the apparatus. In addition, the high voltages present a severe shock hazard.

If the frequency of the alternating current is increased to a higher frequency, typically an ultrasonic frequency, a capacitive displacement current flows between the electrodes of the lamp, which provides ionisation and facilitates ignition at lower strike voltages. However, high frequencies are undesirable for the operation of the lamp, due to the tendency to produce acoustic standing waves in the lamp that can disturb the arc path, and cause lamp flicker and arc instability.

U.S. Pat. No. 5,491,386 discloses a circuit for powering a high-pressure discharge lamp in which a high frequency, greater than the resonant frequency of a tuned circuit is employed to start the lamp, and a lower frequency is used thereafter. A problem with this arrangement, which relies entirely on the tuned circuit to generate an increased voltage for starting the lamp is that the circuit may be unstable around the time of starting the lamp; a complex protocol for controlling the switching frequency is required to alleviate this.

EP-A-408,121 discloses a lamp driver circuit in which a pair of auto-transformers on a common core are employed in conjunction with a capacitor to provide increased voltage to start the lamp. This arrangement requires a purpose built auto-transformer, in which both the inductance and turns ratio of each of four coils must be controlled in order to achieve the desired resonance. Additionally, a sensing coil, and complex control circuitry are required.

SUMMARY OF THE INVENTION

The invention aims to provide a lamp driver circuit in which a sufficient starting voltage can be attained and reliable lamp operation ensured, without unduly complex circuitry.

According to a first aspect, the present invention provides a lamp driver for a discharge lamp comprising A.C. power supply means for supplying power to the lamp and control means for controlling the power supply means to operate at a first output frequency for starting the lamp, and at a second output frequency, lower than the first, for powering the lamp after discharge is initiated, the power supply means preferably including a tuned circuit that is substantially resonant at said first frequency coupled to the output of the power supply means, to generate a greater voltage across the lamp at said first frequency than at said second frequency, the power supply preferably further including transformer means including a primary winding coupled to the tuned circuit and a secondary winding coupled to boost the voltage supplied to the lamp, wherein at said first frequency, a higher voltage is developed across the secondary winding than at said second frequency.

With this arrangement, a high frequency can be used to start the lamp, with the benefit in decreased ignition voltage this provides, but the lamp can be reliably operated at a lower frequency once ignition has occurred. The use of a transformer having a primary winding coupled in series with the tuned circuit provides a simple but effective means for further increasing the voltage, without resorting to close tolerance purpose designed components, and, surprisingly, the simpler circuit provided by the invention may be more stable, so a simpler frequency control arrangement may be employed.

An additional benefit of the provision of a transformer in addition to a tuned circuit is that the transformer properties can be optimised independently of the inductance element of the tuned circuit. Preferably, the transformer core is made of a material which saturates readily.

The first frequency is preferably at least about 10 kHz, and more preferably an ultrasonic frequency (preferably at least about 20 kHz). The second frequency is preferably less than about 1 kHz, preferably in the range 25–500 Hz, more preferably about 80–150 Hz. Preferably, the first frequency is at least 5, more preferably at least 10, 50 or even 100 times the second frequency.

The lamp driver may supply a higher voltage at said first frequency than at said second frequency. The lamp driver may further comprise means operative to increase the voltage at said first frequency to a greater extent than at the second frequency. Provision of a higher voltage facilitates starting.

Preferably, a tuned circuit that is substantially resonant at said first frequency is coupled to the output of the power supply means, to generate a greater voltage across the lamp at said first frequency than at said second frequency. This may provide a convenient way of providing an increased output voltage during starting of the lamp.

More preferably, the tuned circuit comprises inductor means and capacitor means in series, an output to the lamp being taken from the junction of the inductor means and capacitor means. The output from the series resonant circuit may provide a higher voltage than the input to the series resonant circuit.

Preferably, the inductor means is coupled between the output to the lamp and the power supply means, and the capacitor means is coupled in parallel with the lamp. With this arrangement, when the lamp is driven at the second frequency, there will be a relatively low impedance in series with the lamp, and a relatively high impedance in parallel with the lamp.

The circuit preferably further comprises transformer means arranged to provide a higher voltage for output to the lamp at said first frequency than at said second frequency. For example, the transformer may be associated with a resonant circuit (either series or parallel) arranged to maximise the voltage across the windings at the first frequency, or may be designed to couple more efficiently at the first frequency. This enables a higher starting voltage to be developed.

Preferably, the primary winding of a transformer is connected in series with the series resonant circuit, and the secondary of the transformer is connected in series with the lamp. With this arrangement, when current flows through the series resonant circuit to start the lamp, a further voltage will be developed in the secondary winding, and this will further increase the voltage available to start the lamp.

Preferably, the power supply means includes a bridge driver circuit. Use of a bridge driver circuit in the present application may enable better control of the power supply output voltage at both frequencies.

The invention also provides a corresponding method of powering a lamp.

Preferred features of the first aspect may be applied to the method aspect. The invention also provides use of switchable frequencies, or higher than rated frequencies, or lower than rated strike voltages, to power a discharge lamp.

BRIEF DESCRIPTION OF THE DRAWINGS

An embodiment of the invention will now be described, by way of example, with reference to the accompanying drawings in which.

DETAILED DESCRIPTION OF THE PREFERRED EMBODIMENT

Figure 1:
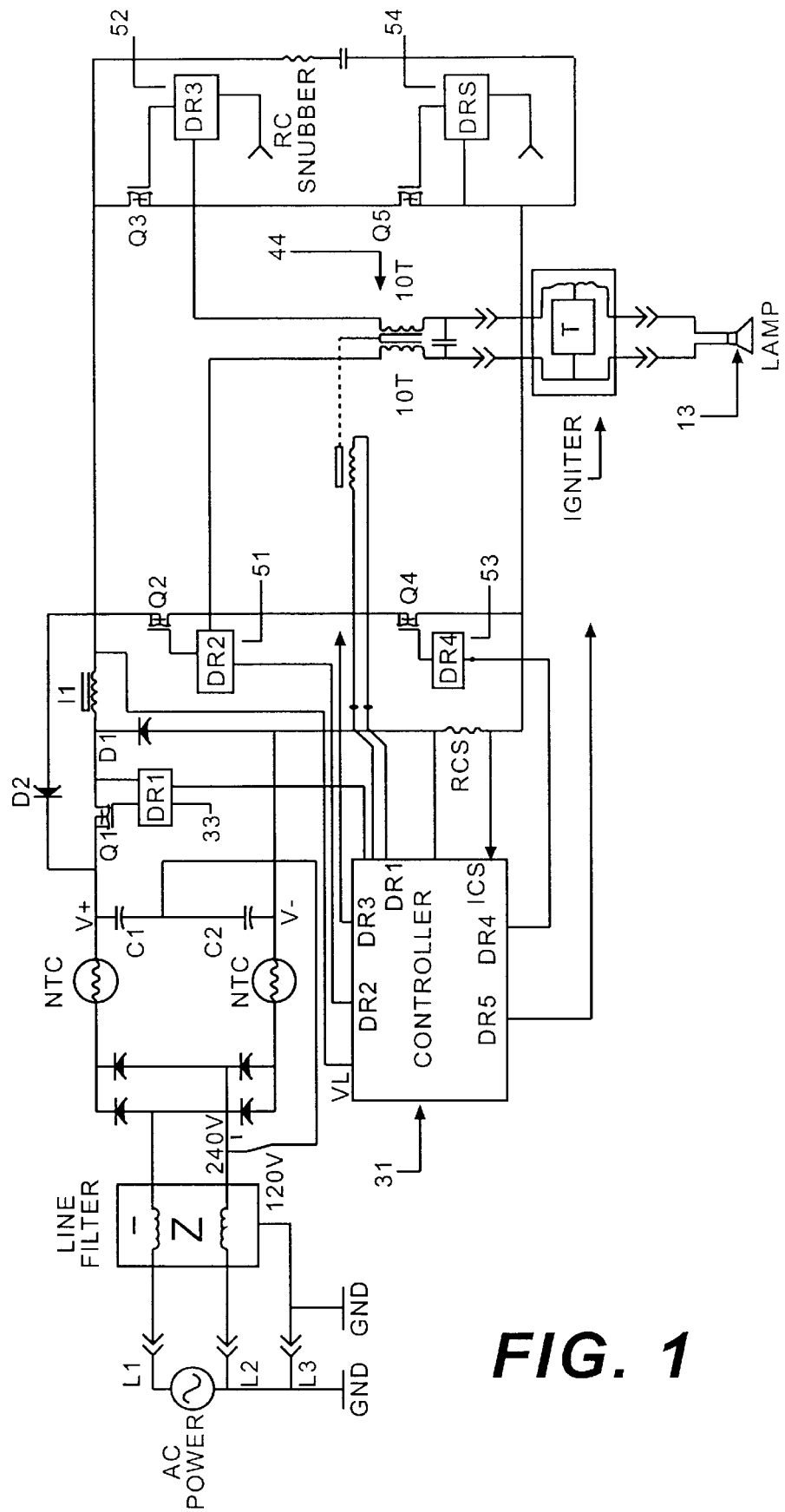
FIG. 1 is a circuit diagram of a prior art lamp driver.
Figure 2:
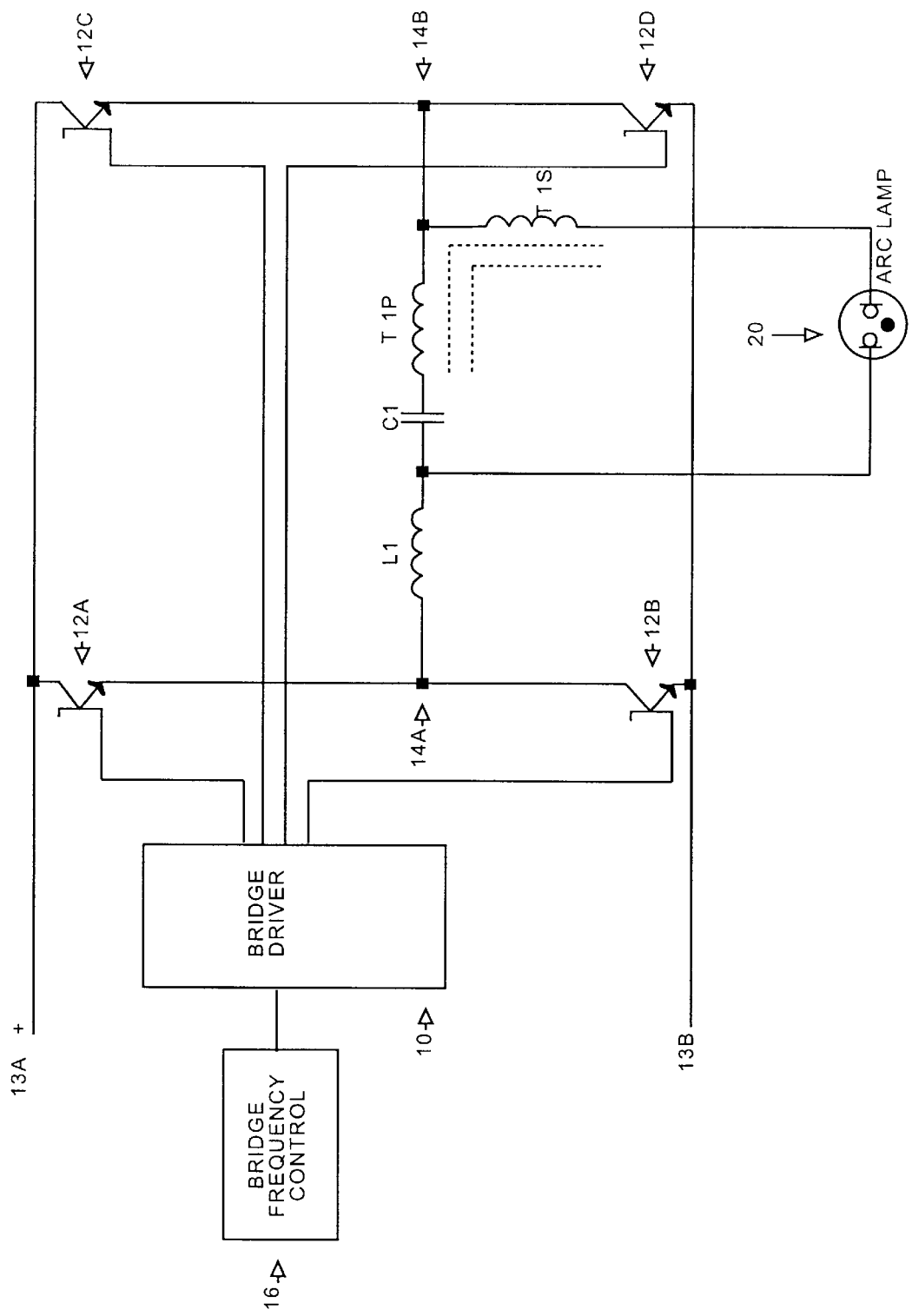
FIG. 2 is a circuit diagram of a lamp driver according to the invention.

Referring to FIG. 2, a bridge driver 10 controls four switching transistors 12a, b, c, d connected between positive and negative supply rails 13a, b to produce an output voltage of alternating polarity at junctions 14a, b respectively. A conventional D.C. power supply circuit (not shown), which need not be regulated, for example a bridge rectifier or voltage multiplier or step-up circuit may be used to supply power to power rails 13a, b, typically of the order of 300V, depending on the operating voltage of the lamp; the details are not germane to this invention. In the embodiment, NPN switching transistors are used, but as will be appreciated, some or all of these could be PNP transistors or MOSFETs or the like; any suitable bridge driver circuitry could be used.

The frequency of switching is controlled by bridge frequency controller 16 which operates to switch the bridge frequency from a high frequency (typically in the range 20–40 kHz, in this embodiment about 22–25 kHz) for starting the lamp to a low frequency (typically in the range 50–200 Hz, in this embodiment about 120 Hz) once the lamp has ignited. Switching from a high frequency to a low frequency may be carried out either after a predetermined time delay sufficient to enable reliable ignition of the lamp, or in response to a sensed condition indicating that the lamp has fired. The sensed condition may be, for example, current flowing in the power supply or in the leads to the lamp 20, or dependent on light output from the lamp. Alternatively, switching may be carried out in response to an input from an operator. Switching after a time delay may offer the benefit of simpler circuitry. Switching in response to a sensed condition may offer the benefit of more reliable starting of the lamp.

Although shown schematically as separate units, the bridge frequency control 16 and the bridge driver 10 are preferably incorporated into a single integrated circuit, which may be analogue or may incorporate digital microprocessor control. The precise nature of the circuitry providing an alternating current which switches from a high frequency to a low frequency is not critical to the invention.

To boost the voltage available for starting the lamp, the lamp 20 is not simply connected directly to the alternating current outputs 14a, 14b. Instead, a series resonant circuit comprising inductor L1 and capacitor C1 are connected across the output terminals, and the lamp 20 connected across the capacitor C1. Thus, at the high frequency, at which L1 and C1 are substantially resonant, the voltage generated across the lamp will be considerably greater than that present across terminals 14a, 14b. At the low frequency, the capacitor C1 will have a high impedance, and the inductor L1 will have a low impedance so the lamp will be supplied with a voltage close to that present across terminals 14a, 14b. This arrangement serves to boost the starting voltage. It will be appreciated that, in the embodiment described, the higher frequency is approximately 200 times the lower frequency, so it is straightforward to select values of L1 and C1 which will have very little effect on the output voltage at the lower frequency.

In addition, in the embodiment shown, a starting transformer comprising primary winding T1P and secondary winding T1S is additionally connected in the circuit. The primary winding T1P is connected in series with capacitor C1 and the alternating current power supply terminal 14b, and the secondary winding is connected in series with the power supply terminal 14b and the lamp 20. Thus, when substantial current is flowing through capacitor C1, which will occur when the high-frequency is supplied at terminals 14a, 14b current will flow through transformer primary T1P, and generate a voltage in transformer secondary T1S. This will further increase the voltage across the lamp. At the low frequency, little current will flow through the capacitor and the transformer primary T1P, and hence less voltage will be generated in the transformer secondary T1S.

Although a single transformer is used in this embodiment, for convenience, a similar effect could be achieved with a number of transformers, preferably having their secondary windings in series with the lamp, for example one connected into each lead to the lamp. As is evident from the voltage waveform in FIG. 3, the transformer saturates during each cycle, thereby increasing the magnitude of the voltage spike for starting the lamp. Alloys which saturate readily are known; one example of a suitable material for the transformer core is sold under the trade name "HCR" by Telcon of Hill House, 1 Little New Street, London.

As will be appreciated, in selecting appropriate values of L1 and C1 to be substantially resonant at the high frequency, the inductance of transformer primary T1P needs to be taken into account, using well-known principles for calculating parameters of such circuits.

Figure 3:
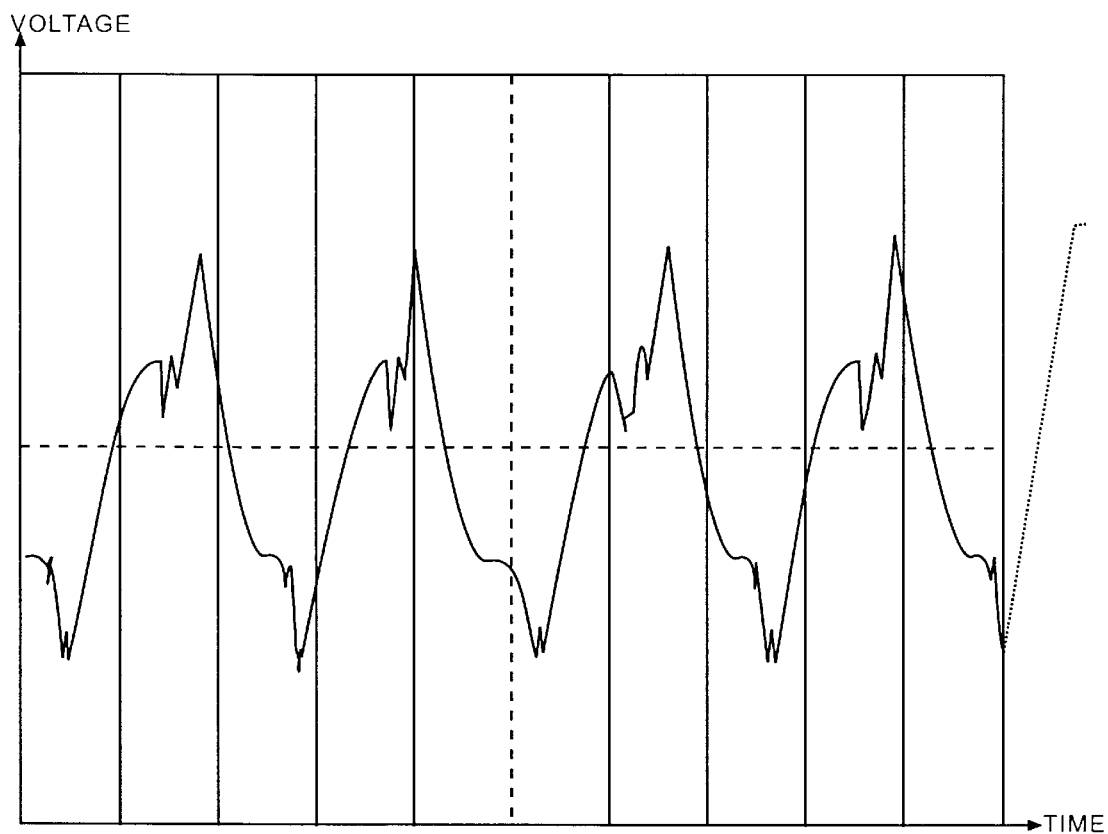
FIG. 3 is a graph showing the typical voltage waveform produced by the circuit of FIG. 2 during ignition.

A typical output of such a circuit when driven at the high frequency is shown in FIG. 3. It can be seen that the waveform exhibits sharp spikes, due to saturation of the transformer core. The voltage peaks had an amplitude of approximately 4–5 kV when driven from a power supply having a DC voltage of approximately 300V between rails 13a and 13b. At a frequency of about 20 kHz this was sufficient to cause reliable striking of an arc lamp which conventionally required a striking voltage of at least 10 kV. Indeed at such frequencies, strike voltages of the order of as low as 3 kV were effective for lamps for which the manufacturer specified a strike voltage of 15 kV or more. In preferred embodiments, the striking voltage is less than about 10 kV, preferably less than about 6 or 7 kV; this reduces problems of insulation.

It will be apparent that various modifications can be made to the circuitry described. For example, further circuitry may be included to boost the starting voltage. Whilst this may detract from the elegant simplicity of the circuitry of the embodiment, this may still make use of the basic feature of the invention of providing alternating current at two different frequencies.

In addition, whilst it is preferable that the same power supply circuitry is used to generate both frequencies, as this may economise on components required, it is possible for separate high frequency and low frequency inverter circuits to be used, with means for switching between them on firing of the lamp.

For the avoidance of doubt, it is to be understood that the frequency of operation need not be constant, nor need it be accurately controlled. In addition, there need not be a sudden transition from high to low frequency, but a substantially continuous transition is possible. As one skilled in the art will appreciate, frequency cannot be controlled to 100% precision, and in any event a typical inverter circuit will not produce a pure sine wave of a single frequency but will produce harmonics; references to frequency in this specification are intended to imply nominal frequencies. Thus, the instantaneous frequency may vary appreciably, provided that the nominal frequency during starting is substantially higher than that during normal operation for a sufficient time to facilitate firing of the tube.

Each feature disclosed herein may be independently provided, unless otherwise stated. The appended abstract is herein incorporated by reference.

What is claimed is:

1. A lamp driver for a discharge lamp, said driver comprising: A.C. power supply means for supplying power to the lamp and control means for controlling the power supply means to operate at a first output frequency for starting the lamp, and at a second output frequency, lower than the first output frequency, for powering the lamp after discharge is initiated, the lamp driver further including a tuned circuit, which is substantially resonant at said first frequency, coupled to the output of the power supply means so as to generate a greater voltage across the lamp at said first frequency than at said second frequency, the lamp driver further including transformer means including a primary winding coupled in series with the tuned circuit and a secondary winding coupled to boost the voltage supplied to the lamp, the primary winding being connected in series with the secondary winding, wherein at said first frequency, a higher voltage is developed across the secondary winding than at said second frequency.

2. A lamp driver according to claim 1, wherein the first frequency is at least about 10 kHz.

3. A lamp driver according to claim 1, wherein the second frequency is less than about 1 kHz.

4. A lamp driver according to claim 1, wherein the second frequency is below the frequency at which acoustic standing waves cause perceptible lamp flicker.

5. A lamp driver according to claim 1, wherein the tuned circuit comprises inductor means and capacitor means in series, an output to the lamp being taken from the junction of the inductor means and capacitor means.

6. A lamp driver according to claim 5, wherein the inductor means is coupled between the output to the lamp and the power supply means, and the capacitor means is coupled in parallel with the lamp.

7. A lamp driver according to claim 5, wherein the primary winding (T1P) of the transformer is connected in series with the series resonant circuit, and the secondary winding (T1S) of the transformer is connected in series with the lamp.

8. A lamp driver according to claim 1, wherein the power supply means includes a bridge driver circuit (10).

9. A lamp driver according to claim 1, wherein the transformer has a core of a material different from the material of the core of the inductor means of the series resonant circuit.

10. A lamp driver according to claim 1, arranged so that, in use, on starting the lamp, a sufficient voltage is present across the primary or secondary winding such that the transformer core material saturates.

11. A method of powering a lamp with a lamp driver comprising A.C. power supply means for supplying power to the lamp and further including a tuned circuit (L1, C1) that is substantially resonant at a first frequency coupled to the output of the power supply means, the lamp driver further including transformer means (T1P, T1S) including a primary winding (T1P) coupled in series with the tuned circuit and a secondary winding (T1S) coupled to boost the voltage supplied to the lamp, the method comprising:
    applying to the lamp an A.C. voltage at said first frequency to generate a first voltage across the lamp to initiate a discharge;
    applying to the lamp an A.C. voltage at a second, lower, frequency to generate a second, lower, voltage across the lamp to sustain the discharge.

12. A method according to claim 11, wherein the first frequency is at least about 10 kHz.

13. A method according to claim 11, wherein the second frequency is less than about 1 kHz.

14. A method according to claim 11, wherein the A.C. voltage applied at said first frequency is selected so that a sufficient voltage is present across the primary or secondary winding such that said transformer saturates.

\* \* \* \* \*